United States Patent
Fiore

(10) Patent No.: US 8,727,765 B2
(45) Date of Patent: May 20, 2014

(54) BENCHTOP HYDRAULIC PLASTIC INJECTION MOLDING MACHINE

(76) Inventor: Levon Joseph Fiore, Woodbridge, VA (US)

( * ) Notice: Subject to any disclaimer, the term of this patent is extended or adjusted under 35 U.S.C. 154(b) by 54 days.

(21) Appl. No.: 13/540,323

(22) Filed: Jul. 2, 2012

(65) Prior Publication Data

US 2013/0011513 A1    Jan. 10, 2013

Related U.S. Application Data

(60) Provisional application No. 61/505,159, filed on Jul. 7, 2011.

(51) Int. Cl.
B29C 45/67    (2006.01)

(52) U.S. Cl.
USPC .......................................... 425/542; 425/589

(58) Field of Classification Search
USPC .................................. 425/542, 589
See application file for complete search history.

(56) References Cited

U.S. PATENT DOCUMENTS

| | | | | |
|---|---|---|---|---|
| 5,914,139 | A * | 6/1999 | Matsubayashi et al. | 425/145 |
| 7,048,533 | B2 * | 5/2006 | Ils et al. | 425/576 |
| 2003/0072839 | A1 * | 4/2003 | Seki et al. | 425/542 |
| 2003/0198709 | A1 * | 10/2003 | Ralph et al. | 425/575 |
| 2003/0203066 | A1 * | 10/2003 | Lust et al. | 425/183 |
| 2006/0280833 | A1 * | 12/2006 | Krell | 425/589 |
| 2008/0124419 | A1 * | 5/2008 | Tanaka | 425/170 |
| 2012/0043045 | A1 * | 2/2012 | Stone et al. | 164/316 |
| 2012/0187599 | A1 * | 7/2012 | Suenami | 264/279 |
| 2012/0193834 | A1 * | 8/2012 | Suenami | 264/328.1 |
| 2013/0269182 | A1 * | 10/2013 | Yamamoto et al. | 29/825 |

* cited by examiner

Primary Examiner — Tim Heitbrink

(57) ABSTRACT

Hydraulically powered injection molder constructed from non-brittle steel channel members, instead of cast iron. It uses threaded vertical rods to support machine components, and threaded nuts to secure the components to the rods. Hydraulic cylinders used are single acting and self-contained, and compression die springs are used to retract the piston after an injection stroke.

18 Claims, 10 Drawing Sheets

BENCHTOP HYDRAULIC PLASTIC INJECTION MOLDING MACHINE

This application claims priority to my provisional application No. 61/505,159 filed on Jul. 7, 2011.

BACKGROUND OF THE INVENTION

It is often desired to manufacture articles out of plastic, both by hobby persons and large companies alike. Many times such production is required to keep the invention secret. In others, it is essential to make small runs and test the market, before hiring a large manufacturer for mass production.

In the past, there was a lack of affordable, capable, lightweight and safe plastic injection equipment.

The small machines currently in production, utilize custom manufactured parts driving up the cost. Since custom injection molding is a specialized trade, there is not enough demand to justify mass production of such equipment in order to lower the price.

The small equipment currently produced is inferior to large industrial injection molding machines, because of injection principle used. Currently produced small machines utilize stagnant heat technology to melt the plastic. Plastic is loaded in the barrel, and electric heater is utilized to melt the plastic before injecting. Since plastic is an insulator and does not conduct heat very well, plastic ends up being overheated. Such practice degrades plastic resins, reducing the quality of the part and inducing harmful fumes. Another affect of overheating the plastic is warpage created in injecting thicker parts, because of induced shrinkage while cooling from abnormally high temperature.

Small machines with higher capabilities utilize cast iron parts to withstand forces for generating higher pressure and clamping force. Such construction makes them prohibitively heavy to be moved and installed by one person. More importantly, common postal carriers cannot be used for shipment, requiring costly and inconvenient truck freight instead.

Besides inferior stagnant heat technology, some small machines also utilize air cylinders to increase pressure beyond what is possible to achieve manually. Such combination is very unsafe. Unlike incompressible hydraulic fluid used in large industrial machines, compressed air creates volatile pressure surge once released into air cylinder used for injection. This pressure surge is transferred to overheated and viscous plastic. In case of any error on the part of the mold maker or the operator, as well as machine failure, the molten plastic will violently squirt out. On the other hand, plastic will safely oozing out in the case of using lower temperature and incompressible injection fluid.

SUMMARY OF THE INVENTION

Injecting molding machine of the present invention is constructed to be inexpensive and lightweight. To achieve inexpensive construction, machine is comprised of modified commonly available parts, instead of custom fabricated parts.

Frame supports are critical parts of the machine; they support components such as injection cylinder, injection barrel and the mold clamping mechanism. These supports have to be very strong to withstand the high forces generated by some of the components listed above. Injection machines currently in production utilize frame supports made of cast iron.

The cast iron supports need to be custom fabricated to fit the design. Cast iron is also known to be brittle, so the parts have to be made quite thick to avoid failure; both of the factors increasing the cost.

The main supports of the machine of the present invention are comprised of channel iron that is lightweight and can be purchased at retail steel supply warehouses. Since channel iron is easily available, there is no need for custom fabrication, significantly reducing the cost.

The machines currently in production have many components in the injection mechanism. The injection barrel is connected to the nozzle by means of threads. Separate heating elements and temperature sensors are present on the barrel and the nozzle. The barrel and nozzle assembly is then fitted to a clamping plate.

To fabricate and assemble all the above components, laborious machining is required. First parts have to be machined to size, and then inner and outer threads have to be cut thereon.

Machine of the current invention is designed to eliminate these unnecessary construction steps. The injection barrel, the nozzle and the clamping plate are integrated into a single assembly. Instead of numerous threads, only one structural weld is required for assembly. Since the nozzle and the barrel are formed integrally, there is good heat conductivity therebetween, and a need for a separate heating element is also eliminated.

Machine of the present invention also uses self-contained hydraulic cylinder, instead of custom hydraulic assemblies. A self-contained hydraulic cylinder is a cylinder wherein a hydraulic valve, a hydraulic motor and a hydraulic pump are all formed as a single unit. Such cylinders are commonly referred to as "bottle jacks" and are universally used in automotive industry for lifting. They are inexpensive, but have two main drawbacks, they are single acting and imprecise. To correct the single action drawback and allow the ram to retract, compression springs are used. To correct the imprecision of the bottle jacks, as well as other components, a yielding frame, further described, is used.

Frames of machines currently in production are designed to be rigid under loading. To achieve such rigidity under high loads, components have to be quite thick. Such construction makes the machine heavy, and often times unsuited for shipment by common postal carriers, or installed by a single person.

The machine of the present invention uses a different, more lightweight, approach regarding frame construction. Instead of being completely rigid, the frame is designed to slightly yield under load, utilizing steel's elastic deformation property. The support members slightly bow under load, and the support rods slightly elongate. The elongations are kept well within the yield limits of the materials. This makes it possible for the frame components to absorb some of the exerted forces without failing, while still providing adequate support for the machine. Such elongations also make it possible to compensate for any imprecision in construction, further reducing cost and weight.

Steel is generally defined as iron having carbon content of under 2.0% by weight. Iron with carbon content of over 2.0% by weight is generally considered cast iron, and is too brittle for application in the yielding frame of the current invention. Some similar air or manually operated machines use aluminum for frame members, but aluminum members are incapable of providing support for hydraulic cylinders of the current invention without being prohibitively thick and/or expensive.

BRIEF DESCRIPTION OF THE DRAWINGS

Following is a brief description of drawings of the injection molder and its parts. Drawings are not made to scale.

Figure 1:
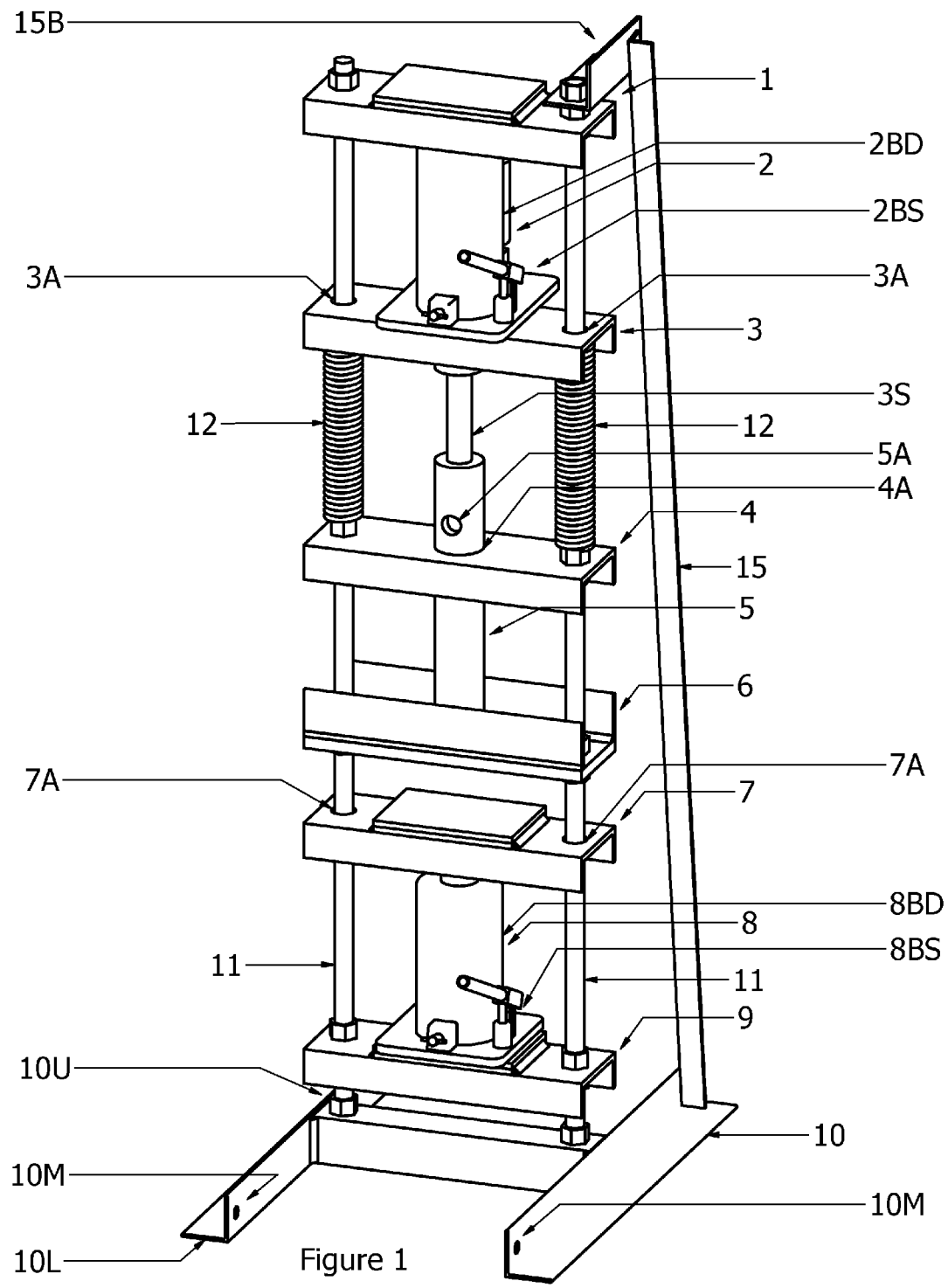
FIG. 1—front isometric view of the injection molder is shown.
Figure 2:
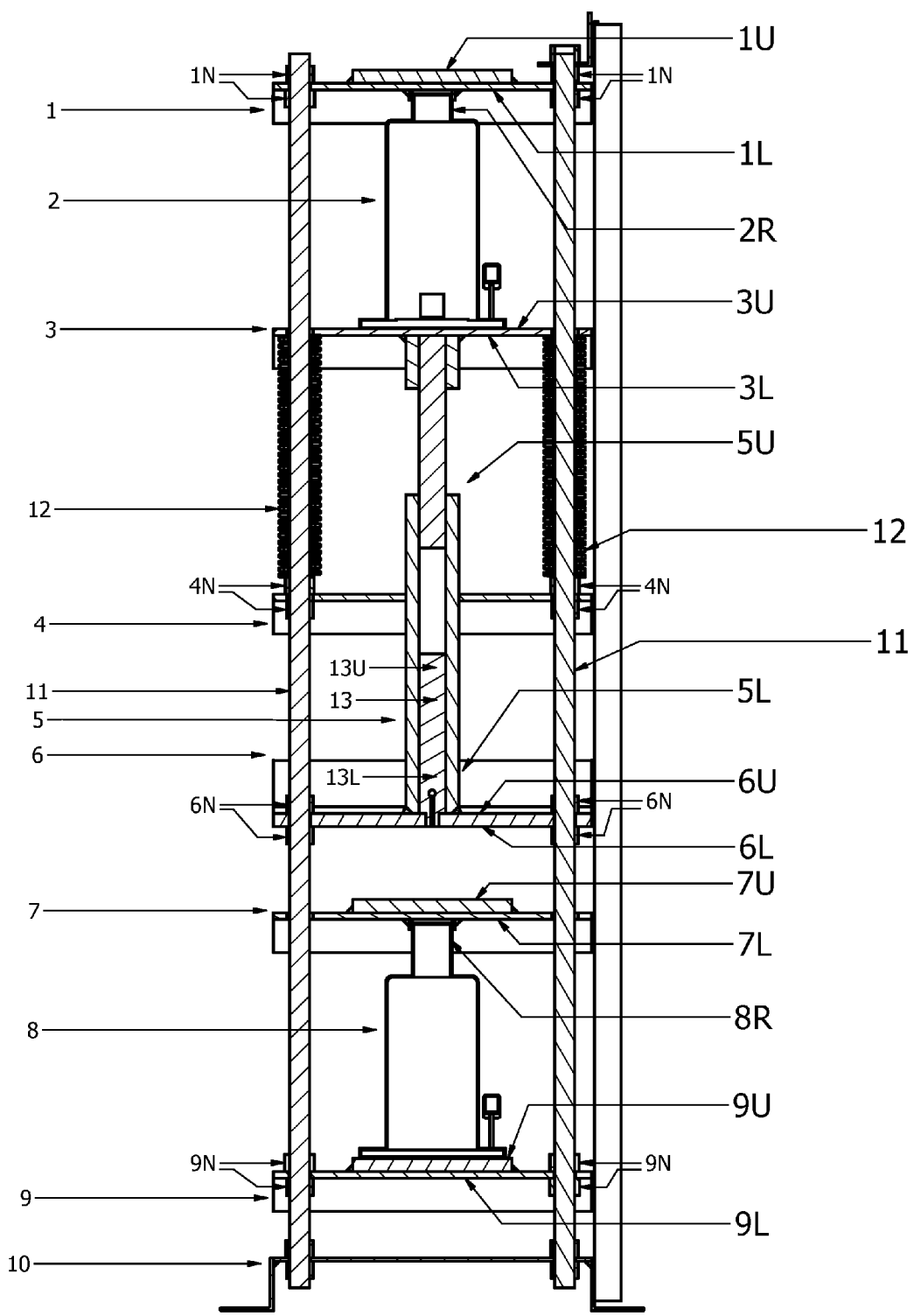
FIG. 2—font sectional view of the injection molder is shown.

Every time a reference is made to an element as being top, bottom, up, down, upper, lower or side-to-side, such reference should be understood as referring to said element as it is positioned in the injection molder's upright position, as shown in FIGS. 1 and 2.

Detailed Description of the Injection Molder

Referring to FIG. 1 and FIG. 2, the injection molder is comprised of:
upper support 1,
injection cylinder 2,
injection piston 3,
barrel support 4,
injection barrel 5,
upper clamp member 6,
lower clamp member 7,
clamp cylinder 8,
lower support 9,
base 10,
frame rods 11,
compression springs 12,
torpedo 13, and
brace 14.

Upper support 1, extending between frame rods 11, is directly and rigidly connected to frame rods 11 by threaded nuts 1N on left and right sides. Upper support 1 has upper and lower portions, 1U and 1L respectively. Lower portion 1L, supports ram 2R of injection cylinder 2.

Injection cylinder 2, or injection actuator, is part of injection molder's actuating system. Injection cylinder 2 is located between frame rods 11, and between upper support 1 and injection piston 3. Injection cylinder 2 has ram 2R and body 2BD. Ram 2R is adapted to extend and retract relative to body 2BD. Injection cylinder 2 also has flat base 2BS. Base 2BS is directly and rigidly connected to body 2BD. Injection cylinder 2 is a self-contained hydraulic cylinder, commonly referred to as "bottle jack."

Injection piston 3, extending between frame rods 11, has apertures 3A on left and right sides. Frame rods 11 pass through apertures 3A, and allow injection piston 3 to move up and down. Injection piston 3 has upper and lower portions, 3U and 3L respectively. Upper portion 3U is formed flat, and supports base 2BS of injection cylinder 2. Injection piston 3 also supports compression springs 12 on its lower portion 3L. Shaft 3S is rigidly connected to injection piston 3, located between frame rods 11. Bottom end of shaft 3S is movably inserted into upper end 5U of barrel 5.

Barrel support 4, extending between frame rods 11, is directly and rigidly connected to frame rods 11 by threaded nuts 4N on left and right sides. Barrel support 4 has aperture 4A through which barrel 5 is inserted. Barrel support 4 keeps barrel 5 rigid from side-to-side movement, but does not restrict its up or down movement.

Barrel 5, located between frame rods 11, has upper and lower ends, 5U and 5L respectively. Barrel 5 has aperture 5A on its upper end 5U. Plastic pellets enter inside barrel 5 through aperture 5A for purpose of injection. Plastic can be inserted through any conventional means used in the art, not illustrated herein, such as manual or automated hopper. The middle portion of barrel 5 is heated by any conventional means, such as electrical heater band, also not illustrated herein. Lower end 5L is directly and rigidly connected to upper portion 6U of upper clamp member 6, by welding.

Upper clamp member 6, extending between frame rods 11, is directly and rigidly connected to frame rods 11 by threaded nuts 6N on left and right sides. Upper clamp member 6 has upper and lower portions, 6U and 6L respectively. Lower portion 6L is formed flat, and is adapted to be in contact with injection mold inserted under it.

Lower clamp member 7, extending between frame rods 11, has apertures 7A on left and right sides. Frame rods 11 pass through apertures 7A, and allow lower clamp member 7 to move up and down. Lower clamp member 7 has upper and lower portions, 7U and 7L respectively. Upper portion 7U is formed flat, and is adapted to be in contact with injection mold inserted above it. Lower portion 7L supports ram 8R of clamp cylinder 8.

Clamp cylinder 8, or clamp actuator, is part of injection molder's actuating system. Clamp cylinder 8 is located between frame rods 11, and between lower clamp member 7 and lower support 9. Clamp cylinder 8 has ram 8R and body 8BD. Ram 8R is adapted to extend and retract relative to body 8BD. Clamp cylinder 8 also has flat base 8BS. Base 8BS is directly and rigidly connected to body 8BD. Clamp cylinder 8 is also a self contained hydraulic cylinder, commonly referred to as "bottle jack."

Lower support 9, extending between frame rods 11, is directly and rigidly connected to frame rods 11 by threaded nuts 9N on left and right sides. Lower support 9 has upper and lower portions, 9U and 9L respectively. Upper portion 9U is formed flat, and supports base 8B of clamp cylinder 8.

Base 10 has a flat lower portion 10L adapted to securely stand on a flat surface such as floor, tabletop or workbench. Base 10 also has upper portion 10U. Upper portion 10U is attached to frame rods 11 by any conventional means, such as threads, press fit or welding. Base 10 is formed out of open L shaped channel iron. Base 10 also has mounting holes 10M to attach it to the work surface.

Frame rods 11, or frame rails, are comprised of fully threaded rods, having threads throughout the complete length. Frame rods 11 are the 'backbone' of the injection molder and provide its main support, such as by withstanding main forces exerted by the actuating system. Frame rods 11 are rigidly and directly connected to upper support 1, barrel support 4, upper clamp member 6, lower support 9, and base 10. Frame rods 11 movably support injection piston 3, compression springs 12, and lower clamp member 7. Frame rods 11 are also adapted to slightly extend under loading to correct for any misalignment in the injection molder or the injection mold.

Compression springs 12 straddle frame rods 11, such as frame rods 11 pass through compression springs 12. Compression springs 12 are positioned between lower portion 3L of injection piston 3, and upper portion 4U of barrel support 4.

Torpedo 13 is inserted into lower end 5L of barrel 5. Torpedo 13 has upper end 13U on its top side, and lower end 13L on bottom side. Torpedo 13 is located between frame rods 11. It is adapted for generating shear heat and aid in melting and mixing plastic, in a manner conventional in the art.

Brace 15 extends between frame rods 11 and base 10. Brace 15 prevents frame rods 11 from side-to-side movement and stabilizes the injection molder. Lower side of brace 15 is rigidly connected to base 10 by any conventional means, such as welding or bolts. Upper side of brace 15 is rigidly connected to frame rods 11 through an L shaped bracket 15B. Bracket 15B is also connected to brace 15 and frame rods 11 by any conventional means, such as bolts or rivets.

Detailed Description of Individual Components

Figure 3:
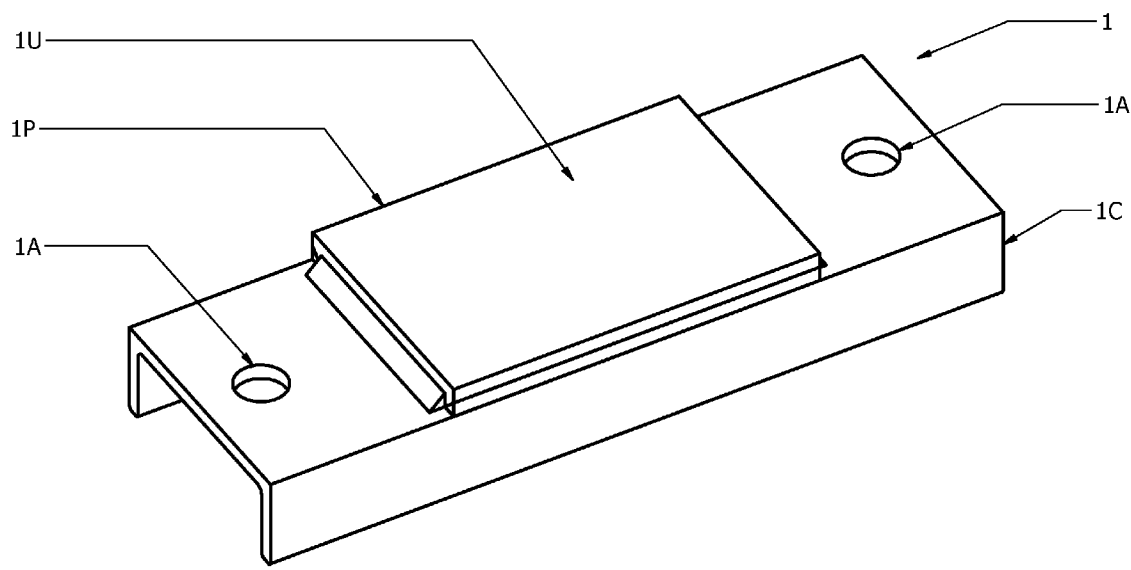
FIG. 3—front isometric view of the upper support is shown.
Figure 4:
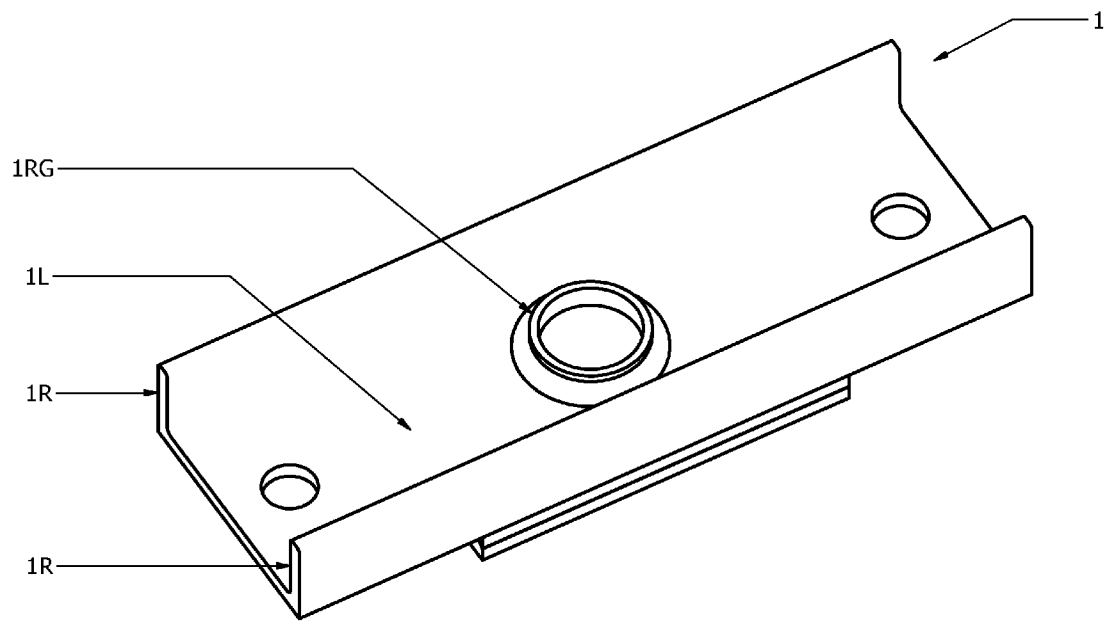
FIG. 4—bottom isometric view of the upper support is shown.

Referring to FIG. 3 and FIG. 4, the upper support is comprised of:
channel 1C,
plate 1P, and
ring 1RG.

Channel 1C is the main component of upper support 1. It is a standard open C shaped channel iron, or C channel, having reinforcing ridges 1R protruding out of its bottom side. Ridges 1R are perpendicular to bottom side of channel 1C. Bottom side of channel 1C and ridges 1R are directly and rigidly connected by means of welding or being formed integrally. Bottom side of channel 1C forms lower portion 1L of upper support 1. Apertures 1A are formed on left and right sides of channel 1C, and adapted to receive frame rods 11. As frame rods 11 pass through apertures 1A, channel 1C is directly and rigidly connected to frame rods 11 by nuts 1N. Nuts 1N secure channel 1C to frame rods 11 on left, right, top and bottom sides.

Plate 1P, formed as a flat steel plate, is directly and rigidly connected to top side of channel 1C by welding. Plate 1P reinforces channel 1C, and prevents it from yielding under force exerted by injection cylinder 2. Top side of plate 1C forms upper portion 1U of upper support 1.

Ring 1RG, formed as a round steel ring, is directly and rigidly connected to bottom side of channel 1C by welding. Ring 1RG receives ram 2R of injection cylinder 2, and secures it from side-to-side movement.

Figure 5:
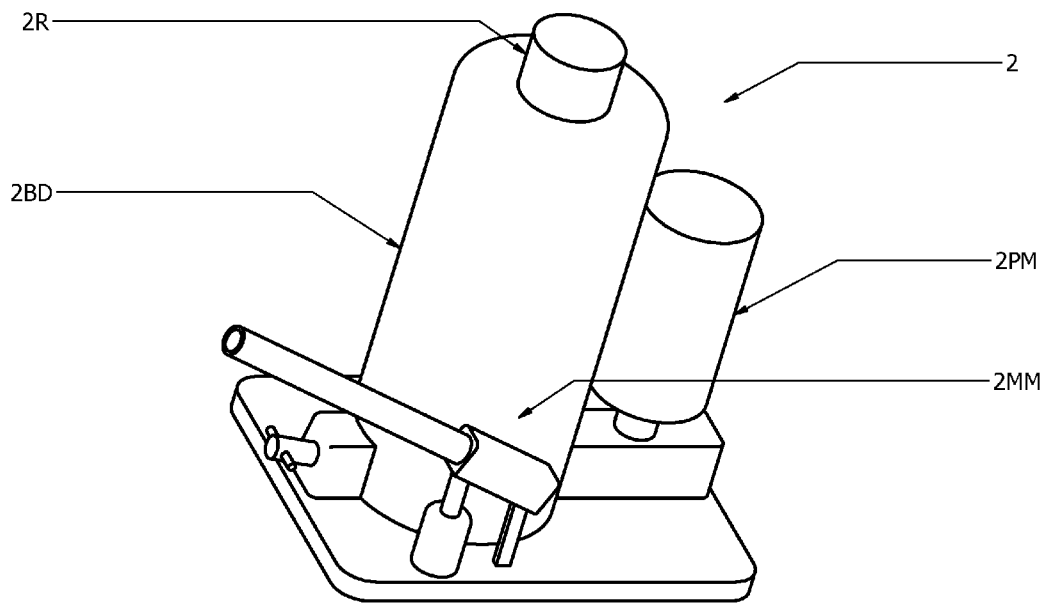
FIG. 5—top isometric view of the injection cylinder is shown.
Figure 6:
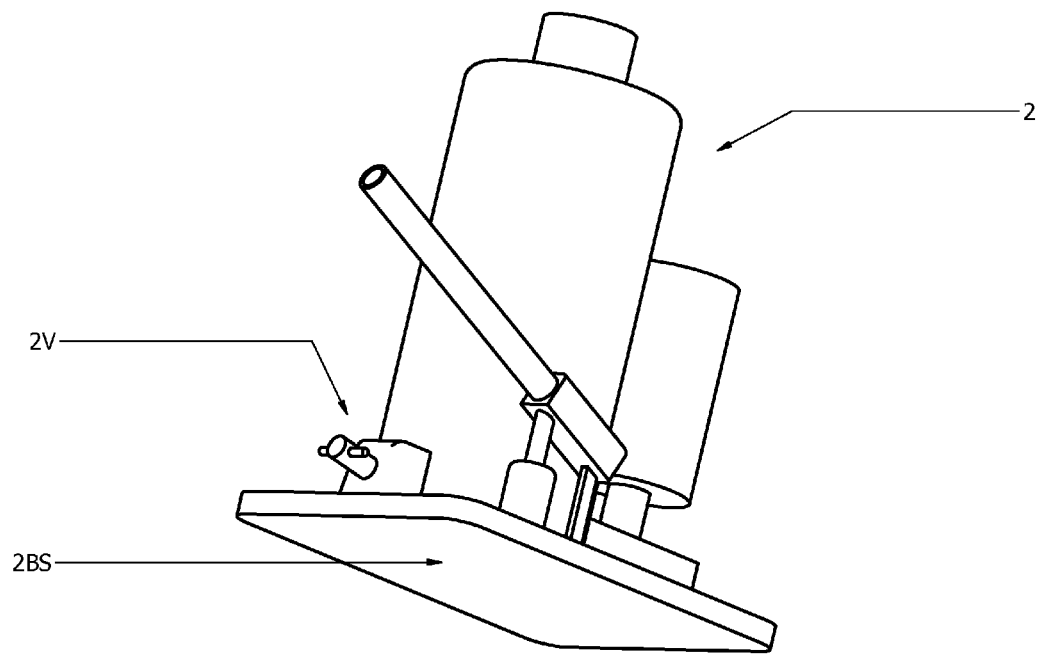
FIG. 6—bottom isometric view of the injection cylinder is shown.

Referring to FIG. 5 and FIG. 6, the injection cylinder is comprised of:
body 2BD,
base 2BS,
ram 2R,
valve assembly 2V,
manual motor 2MM, and
power motor 2PM.

Body 2BD is the main component of injection cylinder 2. It contains hydraulic fluid necessary for actuating injection cylinder 2, and acts as its main fluid reservoir. Body 2BD also contains and supports ram 2R.

Base 2BS is directly and rigidly connected to body 2BD. Bottom of base 2BS is formed flat.

Ram 2R is adapted to extend and retract relative to body 2BD. When injection cylinder 2 is actuated, ram 2R is adapted to extend, and when injection cylinder 2 is relieved, ram 2R is adapted to retract.

Valve assembly 2V is adapted to open and close hydraulic passway inside body 2BD, thereby allowing ram 2R to extend or retract. Valve assembly 2V is directly connected to base 2BS.

Manual motor 2MM is a manual hydraulic motor, powered by means of a handle actuated by an operator. Hydraulic motor 2MM is adapted to pump hydraulic fluid through passway inside body 2BD, thereby powering ram 2R to extend. Manual motor 2MM is directly connected to base 2BS on the upper side thereof.

Power motor 2PM is a power hydraulic motor, powered either by air or electrical means, in a manner conventional in the art. Power motor 2PM is directly connected to base 2BS on the upper side.

Figure 7:
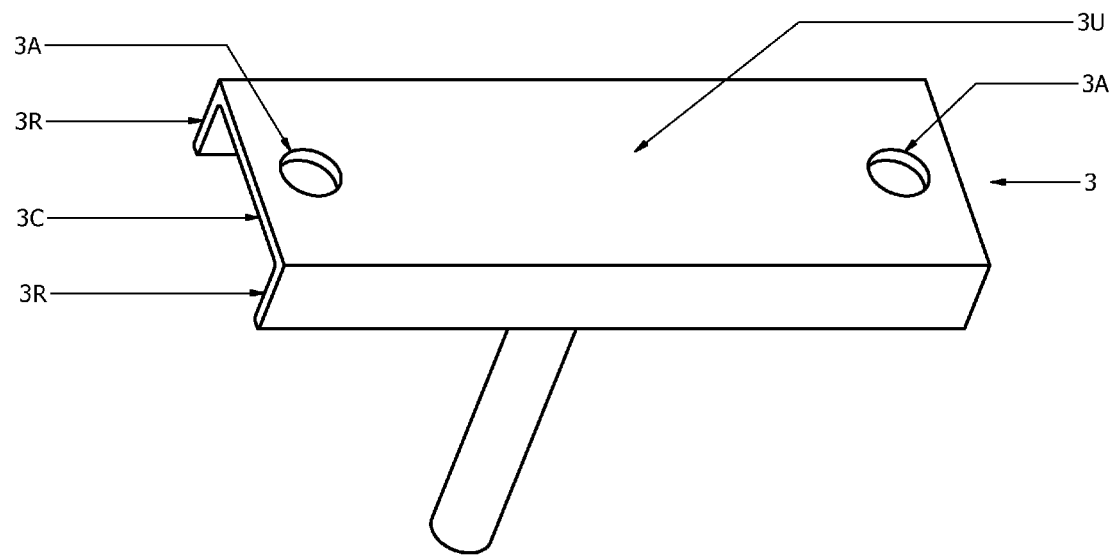
FIG. 7—top isometric view of the injection piston is shown.
Figure 8:
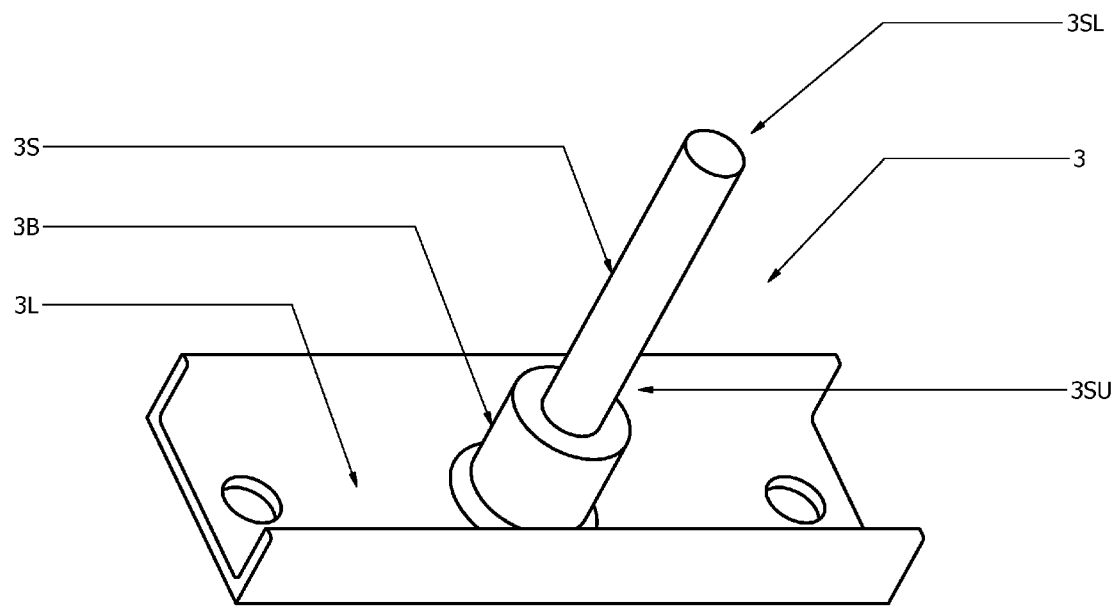
FIG. 8—bottom isometric view of the injection piston is shown.

Referring to FIG. 7 and FIG. 8, the injection piston is comprised of:
channel 3C,
bushing 3B, and
shaft 3S.

Channel 3C, or a cross member, is the main component of injection piston 3. It is a standard open C shaped channel iron, or C channel, having reinforcing ridges 3R protruding out of its bottom side. Ridges 3R are perpendicular to bottom side of channel 3C. Bottom side of channel 3C and ridges 3R are directly and rigidly connected together by welding or being formed integrally. Top side of channel 3C forms upper portion 3U of injection piston 3. Bottom side of channel 3C forms lower portion 3L of injection piston 3. Upper portion 3U is formed flat.

Bushing 3B is directly and rigidly connected to lower portion 3L of injection piston 3 by welding. Bushing 3B rigidly connects shaft 3S to channel 3C. Shaft 3S is inserted into bushing 3B and attached to it by any conventional means, such as press fit, cross pin, threads or welding. Bushing 3B provides lateral support for shaft 3S.

Shaft 3S has upper and lower ends, 3SU and 3SL respectively. Upper end 3SU is rigidly connected to channel 3C by means of bushing 3B. Lower end 3SL is inserted into barrel 5. Lower end 3SL is in direct contact with plastic inside barrel 5, and generates injection pressure as piston 3 lowers. Shaft 3S is formed of a much harder allow steel than channel 3C. Such dissimilar alloys can not be joined directly by welding, so a bushing is critical to connect them indirectly.

Figure 9:
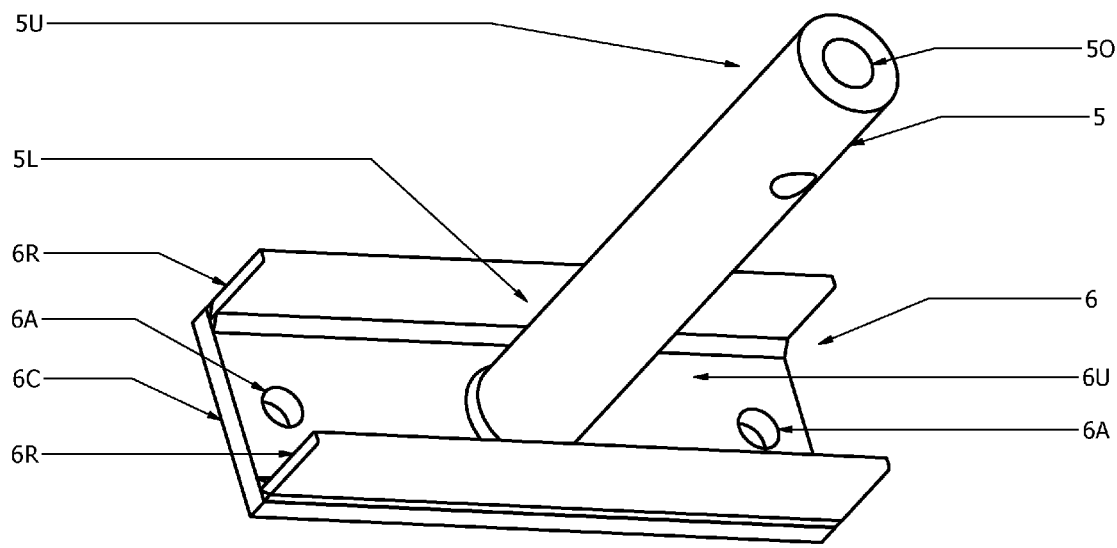
FIG. 9—top isometric view of the barrel and the upper clamp member is shown.
Figure 10:
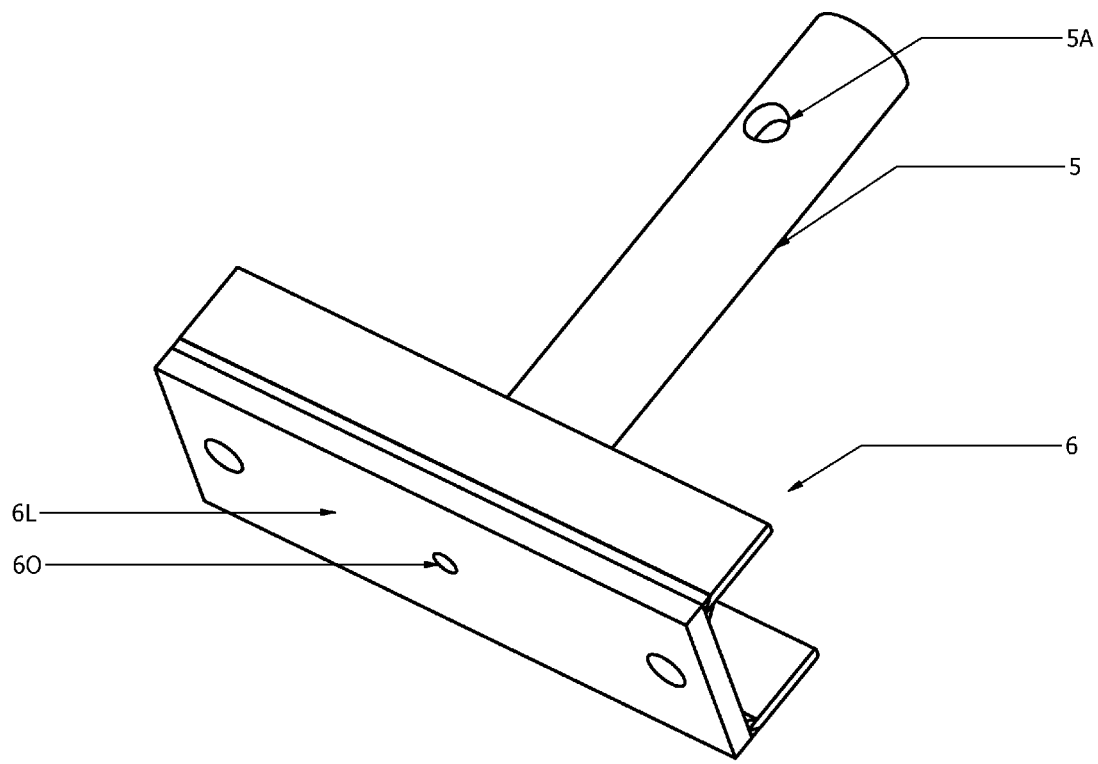
FIG. 10—bottom isometric view of the barrel and the upper clamp member is shown.

Referring to FIG. 9 and FIG. 10, the barrel is comprised of:
upper end,
an opening,
an aperture, and
lower end.

Upper end 5U is located on the upper portion of injection barrel 5.

Opening 5O is located on upper end 5U and adapted to receive shaft 3S of injection piston 3. Shaft 3S is adapted to move up and down, through opening 5O, inside barrel 5. As shaft 3S is lowered, plastic is compressed insider barrel 5.

Aperture 5A is located on the side of barrel 5, also on upper end 5U.

Lower end 5L is located on the lower portion of injection barrel 5.

Referring to FIG. 9 and FIG. 10, the upper clamp member is comprised of:
- channel 6C, and
- opening 6O.

Channel 6C is the main component of upper clamp member 6. It is an open C shaped channel iron, or C channel, having reinforcing ridges 6R protruding out of its top side. Ridges 6R are perpendicular to top side of channel 6C. Top side of channel 6C and ridges 6R are directly and rigidly connected by welding. Top side of channel 6C forms upper portion 6U of clamp member 6. Bottom side of channel 6C forms lower portion 6L of clamp member 6. Lower portion 6L is formed flat. Apertures 6A are formed on left and right sides of channel 6C, and adapted to receive frame rods 11. As frame rods 11 pass through apertures 6A, channel 6C is directly and rigidly connected to frame rods 11 by nuts 6N. Nuts 6N secure channel 6C to frame rods 11 on left, right, top and bottom sides.

Opening 6O is located between apertures 6A. Opening 6O extends between upper portion 6U and lower portion 6L of channel 6C. Opening 6O is also in direct communication with inside opening 5O of barrel 5.

Figure 11:
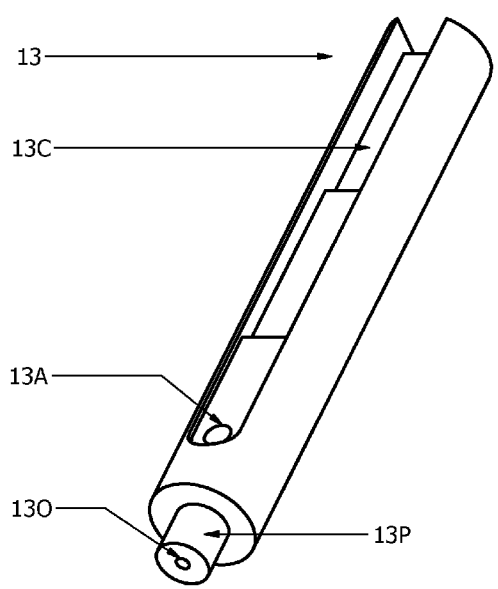
FIG. 11—top isometric view of the torpedo is shown.
Figure 12:
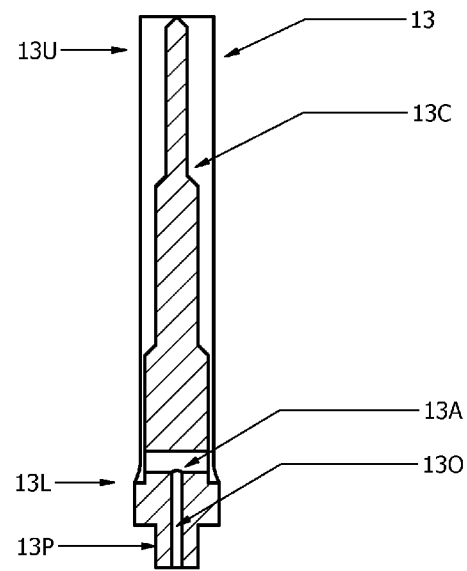
FIG. 12—front sectional view of the torpedo is shown.

Referring to FIG. 11 and FIG. 12, the torpedo is comprised of:
- Cavity 13C,
- Aperture 13A,
- Opening 13O, and
- Protrusion 13P.

Cavity 13C is a continuously narrowing cavity, that starts at upper portion 13U of torpedo 13. As plastic enters cavity 13C it gets continuously compressed between the cavity and opening 5O of barrel 5. Cavity 13C can have round or rectangular profile, in a manner conventional in the art.

Aperture 13A is drilled across torpedo 13, and extend from one to the other side. Ends of aperture 13A are in direct communication with cavity 13C and its middle is in direct communication with opening 13O. As molten plastic travels down cavity 13C it flows out through aperture 13A to opening 13O.

Opening 13O is drilled in lower portion 13L of torpedo 13, and extends longitudinally along its length. Opening 13O extends completely through protrusion 13P of torpedo 13, and allows molten plastic to travel from aperture 13A to injection mold.

Protrusion 13P is formed on lower end 13L of torpedo 13, and extends longitudinally along its length. Protrusion 13P is located between frame rods 11.

Figure 13:
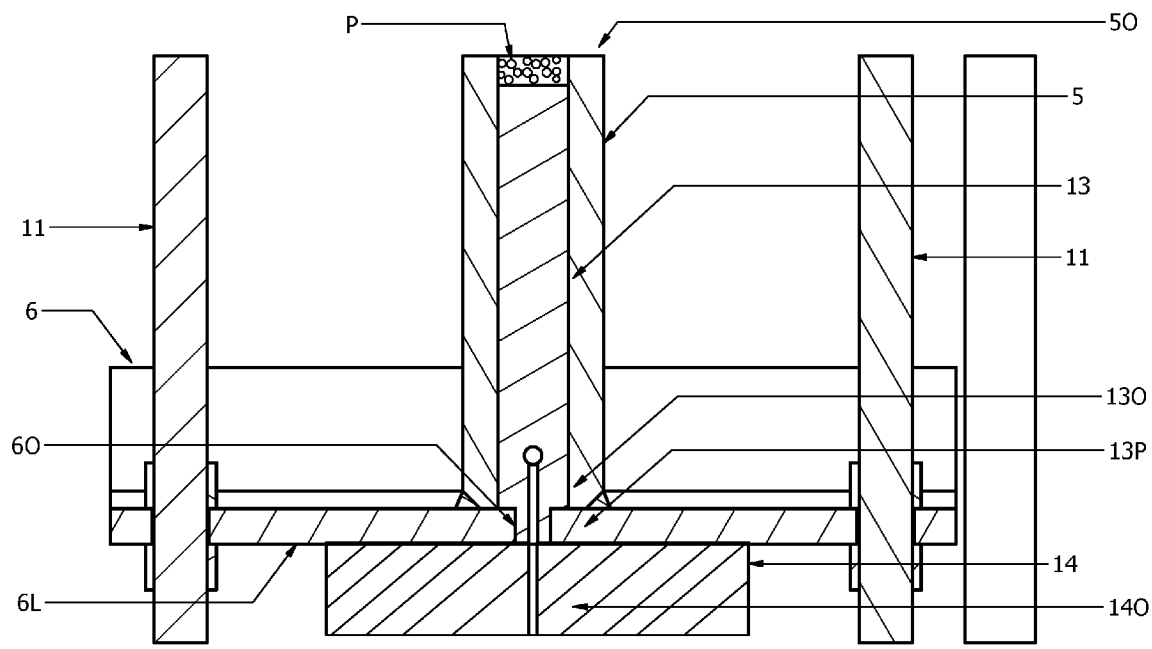
FIG. 13—front sectional view of the barrel, the torpedo, the upper clamp member and the injection mold, with conjunction with the frame rods, is shown.

Referring to FIG. 13, relationship between torpedo 13 and upper clamp member 6 are described.

Torpedo 13 is inserted into barrel 5 through opening 5O. Protrusion 13P of torpedo 13 extends completely through opening 6O of upper clamp member 6. Opening 6O being located between frame rods 11. On its upper end, protrusion 13P is directly and rigidly connected to torpedo 13, by any conventional means known in the art. In this case, being formed integrally. Lower end of protrusion 13P is flush with lower surface 6L of upper clamp member 6.

During an injection cycle injection mold 14 is inserted under upper clamp member 6. Injection mold having sprue opening 14O through which plastic is injected, in a manner conventional in the art. Protrusion 13P delivers plastic from opening 5O of barrel 5 into the injection mold 14 via opening 13O. Opening 13O of protrusion 13P being in direct communication with sprue opening 14O of injection mold 14.

Plastic pellets P enter in opening 5O of barrel 5 for purpose of injection. As pellets P travel down opening 5O they are gradually melted by combined shear heat generated by torpedo 13 and stagnant heat, such as from electric heater band positioned around barrel 5, in a manner conventional in the art.

Figure 14:
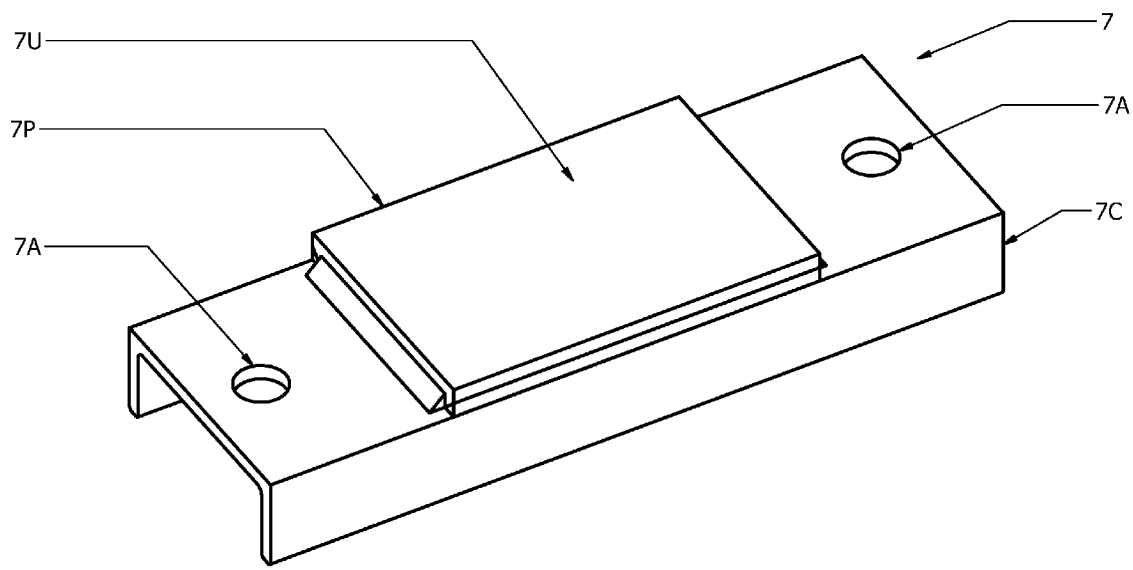
FIG. 14—top isometric view of the lower clamp member is shown.
Figure 15:
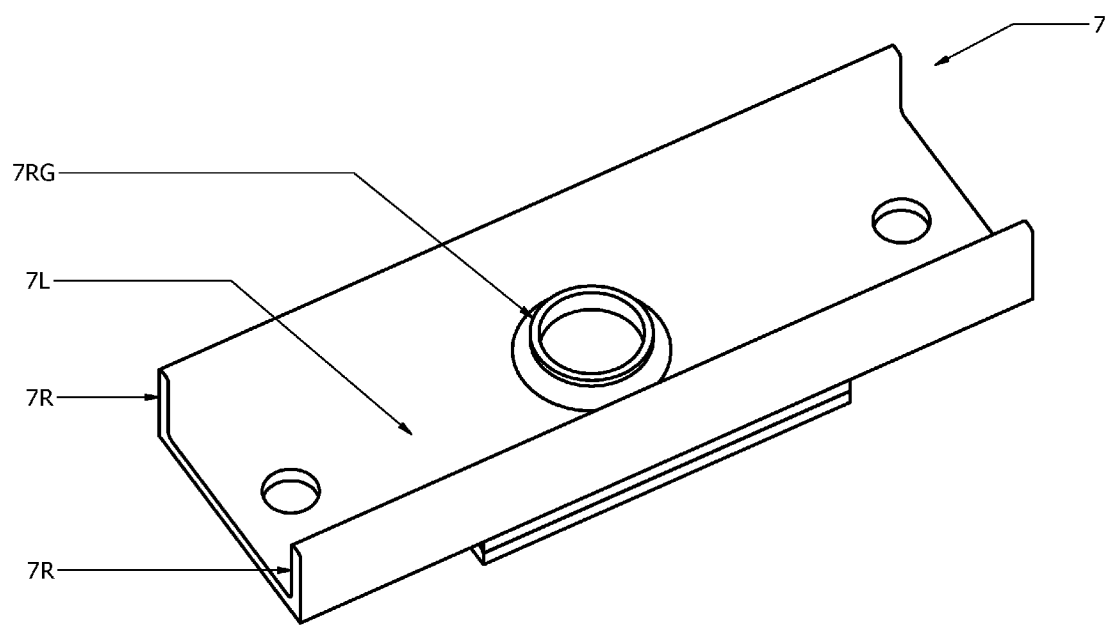
FIG. 15—bottom isometric view of the lower clamp member is shown.

Referring to FIG. 14 and FIG. 15, the lower clamp member is comprised of:
- channel 7C,
- plate 7P, and
- ring 7RG.

Channel 7C is the main component of lower clamp member 7. It is a standard open C shaped channel iron, or C channel, having reinforcing ridges 7R protruding out of its bottom side. Ridges 7R are perpendicular to bottom side of channel 7C. Bottom side of channel 7C and ridges 7R are directly and rigidly connected by welding or being formed integrally. Bottom side of channel 7C forms lower portion 7L of lower clamp member 7. Apertures 7A are formed on left and right sides of channel 7C, and adapted to receive frame rods 11.

Plate 7P, formed as a flat steel plate, is directly and rigidly connected to top side of channel 7C by welding. Plate 7P reinforces channel 7C, and prevents it from yielding under force exerted by clamp cylinder 8. Top side of plate 7C forms upper portion 7U of lower clamp member 7.

Ring 7RG, formed as a round steel ring, is directly and rigidly connected to bottom side of channel 7C by welding. Ring 7RG receives ram 8R of clamp cylinder 8, and secures it from side-to-side movement.

Figure 16:
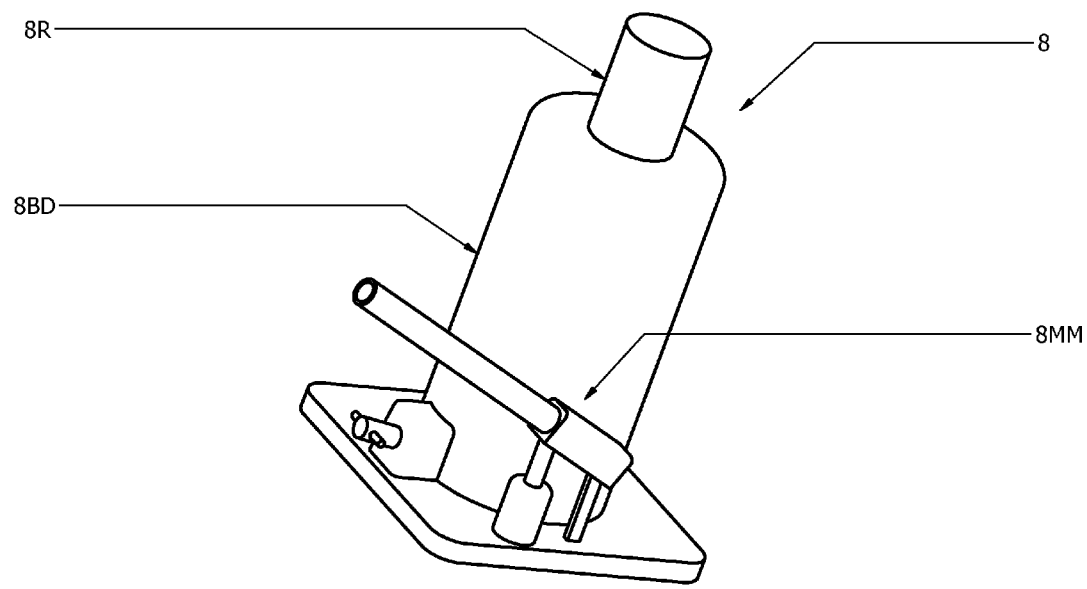
FIG. 16—top isometric view of the clamp cylinder is shown.
Figure 17:
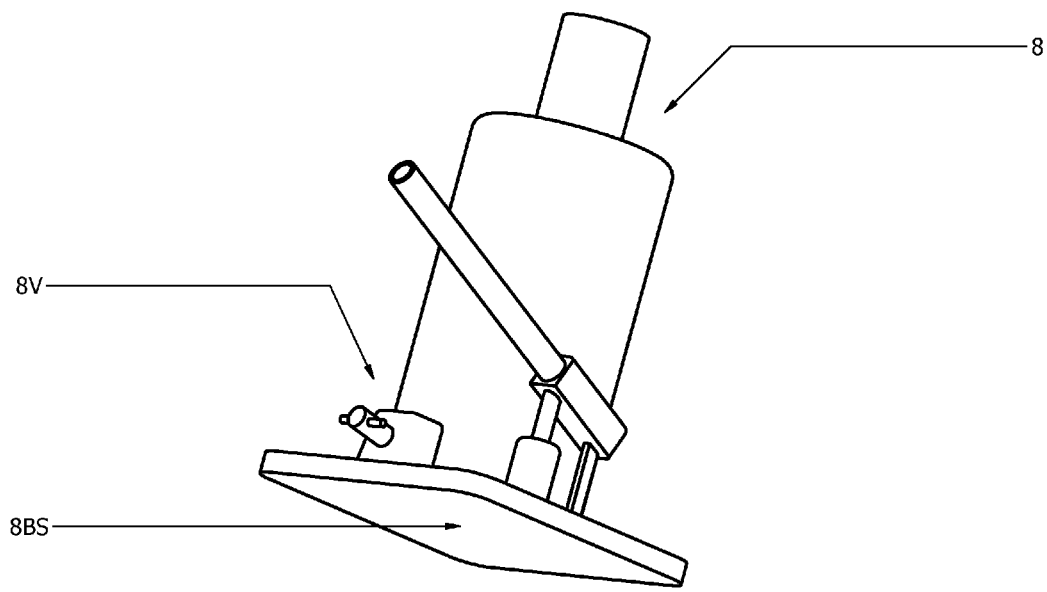
FIG. 17—bottom isometric view of the clamp cylinder is shown.

Referring to FIG. 16 and FIG. 17, the clamping cylinder is comprised of:
- body 8BD,
- base 8BS,
- ram 8R,
- valve assembly 8V, and
- manual motor 8MM.

Body 8BD is the main component of clamping cylinder 8. It contains hydraulic fluid necessary for actuating clamping cylinder 8, and acts as its main fluid reservoir. Body 8BD also contains and supports ram 8R.

Base 8BS is directly and rigidly connected to body 8BD. Bottom of base 8BS is formed flat.

Ram 8R is adapted to extend and retract relative to body 8BD. When clamping cylinder 8 is actuated, ram 8R is adapted to extend, and when clamping cylinder 8 is relieved, ram 8R is adapted to retract.

Valve assembly 8V is adapted to open and close hydraulic passway inside the body 8BD, thereby allowing ram 8R to extend or retract. Valve assembly 8V is directly connected to base 8BS.

Manual motor 8MM is a manual hydraulic motor, powered by means of a handle actuated by an operator. Hydraulic motor 8MM is adapted to pump hydraulic fluid through passway inside body 8BD, thereby powering ram 8R to extend. Manual motor 8MM is directly connected to base 8BS on the upper side.

Figure 18:
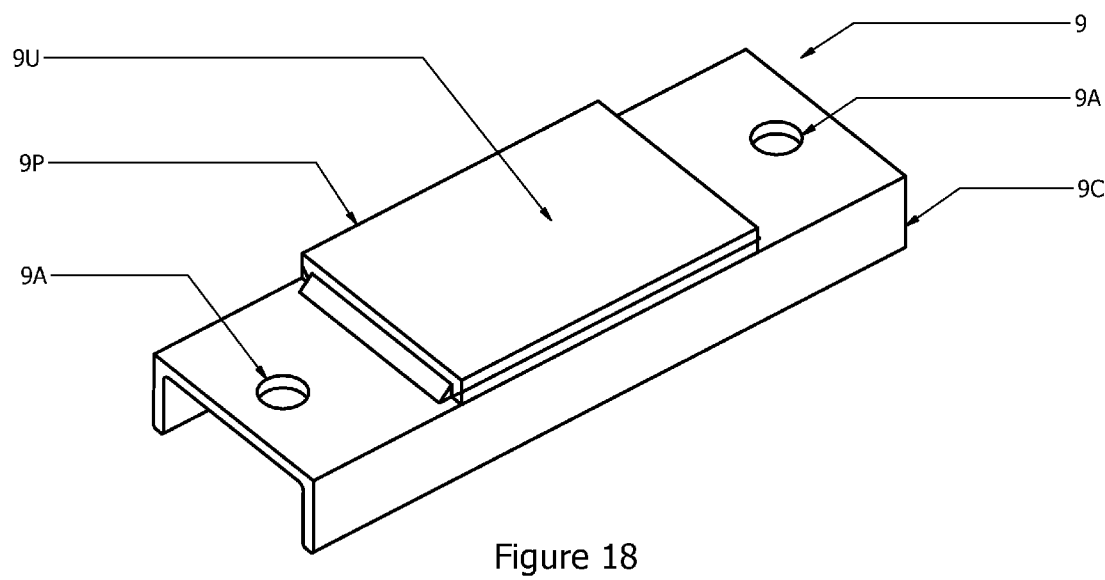
FIG. 18—top isometric view of the lower support is shown.
Figure 19:
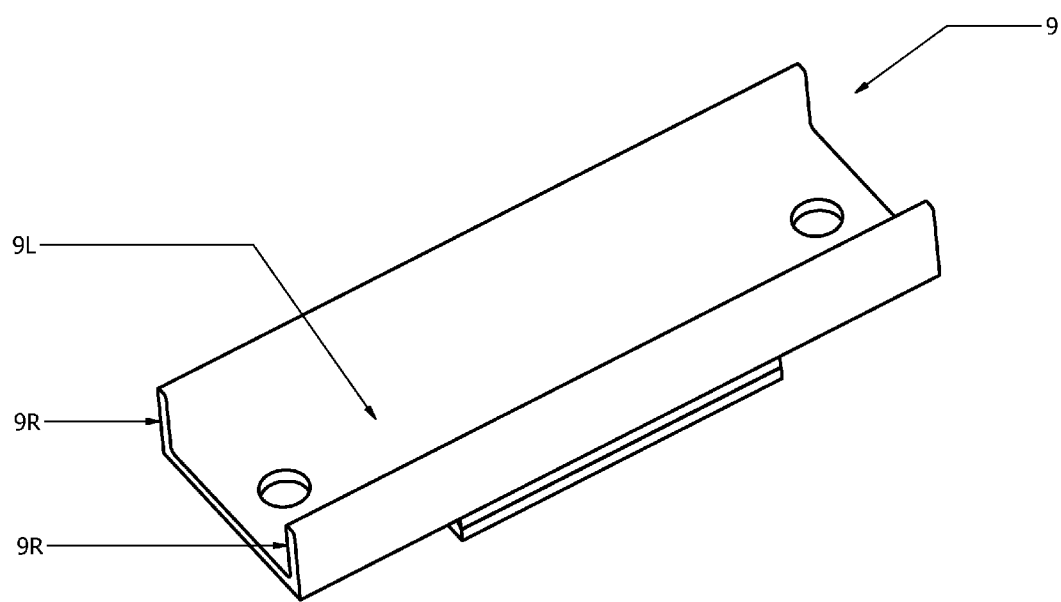
FIG. 19—bottom isometric view of the lower support is shown.

Referring to FIG. 18 and FIG. 19, the lower support is comprised of:
- channel 9C, and
- plate 9P.

Channel 9C is the main component of lower support 9. It is a standard open C shaped channel iron, or C channel, having reinforcing ridges 9R protruding out of its bottom side. Ridges 9R are perpendicular to bottom side of channel 9C. Bottom side of channel 9C and ridges 9R are directly and rigidly connected by welding or being formed integrally. Bottom side of channel 9C forms lower portion 9L of lower support 9. Apertures 9A are formed on left and right sides of channel 9C, and adapted to receive frame rods 11. As frame rods 11 pass through apertures 9A, channel 9C is directly and rigidly connected to frame rods 11 by nuts 9N. Nuts 9N secure channel 9C to frame rods 11 on left, right, top and bottom sides.

Plate 9P, formed as a flat steel plate, is directly and rigidly connected to top side of channel 9C by welding. Plate 9P reinforces channel 9C, and prevents it from yielding under force exerted by clamp cylinder 8. Top side of plate 9C forms upper portion 9U of lower support 9.

Detailed Description of an Injection Cycle

For the injection cycle to take place, injection mold is first inserted between upper clamp member 6 and lower clamp member 7. Then clamp cylinder 8 is actuated, thereby raising lower clamp member 7. As a result, injection mold is secured between upper clamp member 6 and lower clamp member 7. Then plastic is poured into aperture 5A entering barrel 5, where it is melted in a manner conventional in the art. For example, through stagnant heat from an electric heater band combined with shear heat generated by injection piston. Injection cylinder 2 is then actuated, lowering the injection piston 3 and compressing compression springs 12 at the same time. As injection piston 3 lowers, the shaft 3S also lowers, thereby compressing the plastic inside barrel 5 and forcing it into the cavity of the injection mold. After it is determined that injection mold is full, through any conventional means known in the art, such as a pressure sensor or timing device, injection cycle is partially completed. Injection cylinder 2 is then relieved, and extension of compression springs 12 causes injection cylinder 2 and injection piston 3 to be returned to their original positions, or to retract. Clamp cylinder 8 is then also relieved, releasing the injection mold from being clamped between upper clamp member 6 and lower clamp member 7. Injection mold can then be taken out, and injection cycle repeated.

The above description is intended to be illustrative and not exhaustive. Many variations are possible within the spirit of the invention to one of ordinary skill in the art. Such variations are intended to be included within the scope of the following claims.

I claim:

1. A plastic injection molder comprising:
    a base;
    two frame rails connected to the base, and extending vertically;
    an upper support extending horizontally between the frame rails, and rigidly connected to the frame rails;
    an injection actuator positioned between the upper support and an injection piston, and capable to exert force on the injection piston;
    the injection piston positioned between the frame rails, and movably connected to the frame rails, and inserted into a barrel at least partially;
    the barrel comprising an opening and an aperture, and positioned between the frame rails and below the injection actuator;
    the aperture of the barrel formed on the side of the barrel, and is in communication with the opening of the barrel;
    an upper clamp member comprising an opening and a channel, and extending horizontally between the frame rails, and rigidly connected to the frame rails, and positioned below the barrel;
    the opening of the upper clamp member is in communication with the opening of the barrel;
    the channel of the upper clamp member is an open C channel having a flat portion and reinforcing ridges connected to the flat portion;
    a lower clamp member extending horizontally between the frame rails, and movably connected to the frame rails, and positioned below the upper clamp member;
    the upper clamp member and the lower clamp member capable of securing an injection mold therebetween;
    a clamp actuator positioned between a lower support and the lower clamp member, and capable of exerting force on the lower clamp member;
    the lower support extending horizontally between the frame rails, and rigidly connected to the frame rails.

2. The plastic injection molder, as claimed in claim 1, wherein the upper support, the upper clamp member and the lower clamp member are directly connected to the frame rails.

3. The plastic injection molder, as claimed in claim 1, further comprising a plate;
    the plate is reinforcing at least one of the upper support, the upper clamp member and the lower support by being directly connected to it by welding.

4. The plastic injection molder, as claimed in claim 1, wherein the frame rails are threaded rods, and withstand at least majority of forces exerted by the injection actuator and the clamp actuator.

5. The plastic injection molder, as claimed in claim 1, wherein the barrel is directly and rigidly connected to the upper clamp member.

6. The plastic injection molder, as claimed in claim 1, further comprising a barrel support;
    the barrel is inserted through the barrel support;
    the barrel support is extending between the frame rails and is stabilizing the barrel from side-to-side movement.

7. A plastic injection molder comprising:
    a base;
    two frame rails connected to the base, and extending vertically;
    an upper support extending horizontally between the frame rails, and rigidly connected to the frame rails;
    an injection actuator positioned between the upper support and an injection piston, and capable to exert force on the injection piston;
    the injection actuator is a single acting hydraulic cylinder having a base;
    a hydraulic valve assembly directly connected to the base of the injection actuator;
    the injection piston positioned between the frame rails, and movably connected to the frame rails, and inserted into a barrel at least partially;
    the barrel comprising an opening and an aperture, and positioned between the frame rails and below the injection actuator;
    the aperture of the barrel formed on the side of the barrel, and is in communication with the opening of the barrel;
    an upper clamp member extending horizontally between the frame rails, and rigidly connected to the frame rails, and positioned below the barrel;
    a lower clamp member extending horizontally between the frame rails, and movably connected to the frame rails, and positioned below the upper clamp member;
    the upper clamp member and the lower clamp member capable of securing an injection mold therebetween;
    a clamp actuator positioned between a lower support and the lower clamp member, and capable of exerting force on the lower clamp member;
    the lower support extending horizontally between the frame rails, and rigidly connected to the frame rails.

8. The plastic injection molder, as claimed in claim 6, wherein the upper support, the upper clamp member and the lower clamp member are directly connected to the frame rails.

9. The plastic injection molder, as claimed in claim 6, further comprising a plate;
   the plate is reinforcing at least one of the upper support, the upper clamp member and the lower support by being directly connected to it by welding.

10. The plastic injection molder, as claimed in claim 6, wherein the frame rails are threaded rods, and withstand at least majority of forces exerted by the injection actuator and the clamp actuator.

11. The plastic injection molder, as claimed in claim 6, further comprising a spring;
   the spring is capable of exerting force on the injection actuator and the injection piston.

12. The plastic injection molder, as claimed in claim 11, wherein the spring is a compression spring, and at least one of the frame rails passes through the spring.

13. A plastic injection molder comprising:
   a base;
   two frame rails connected to the base, and extending vertically;
   an upper support extending horizontally between the frame rails, and rigidly connected to the frame rails;
   an injection actuator positioned between the upper support and an injection piston, and capable of exerting force on the injection piston;
   the injection piston is comprised of a cross member, a bushing and a shaft, and positioned between the frame rails, and movably connected to the frame rails, and inserted into a barrel at least partially;
   the shaft is inserted through the bushing, and rigidly connected to the bushing;
   the bushing is rigidly connected to the cross member and provides lateral support for the shaft;
   the barrel comprising an opening and an aperture, and positioned between the frame rails and below the injection actuator;
   the aperture of the barrel formed on the side of the barrel, and is in communication with the opening of the barrel;
   an upper clamp member extending horizontally between the frame rails, and rigidly connected to the frame rails, and positioned below the barrel;
   a lower clamp member extending horizontally between the frame rails, and movably connected to the frame rails, and positioned below the upper clamp member;
   the upper clamp member and the lower clamp member capable of securing an injection mold therebetween;
   a clamp actuator positioned between a lower support and the lower clamp member, and capable of exerting force on the lower clamp member;
   the lower support extending horizontally between the frame rails, and rigidly connected to the frame rails.

14. The plastic injection molder, as claimed in claim 13, wherein the upper support, the upper clamp member and the lower clamp member are directly connected to the frame rails.

15. The plastic injection molder, as claimed in claim 13, further comprising a plate;
   the plate is reinforcing at least one of the upper support, the upper clamp member and the lower support by being directly connected to it by welding.

16. The plastic injection molder, as claimed in claim 13, wherein the frame rails are threaded rods, and withstand at least majority of forces exerted by the injection actuator and the clamp actuator.

17. The plastic injection molder, as claimed in claim 13, further comprising a brace, the brace is extending between the base and the frame rails, and stabilizing the plastic injection molder from side-to-side movement.

18. The plastic injection molder, as claimed in claim 17, further comprising a bracket;
   the bracket is connecting the brace to at least one of the frame rails.

\* \* \* \* \*